Jan. 29, 1952 S. J. MIKINA 2,583,790
FRICTIONAL GEAR MECHANISM
Filed Nov. 10, 1948 2 SHEETS—SHEET 1
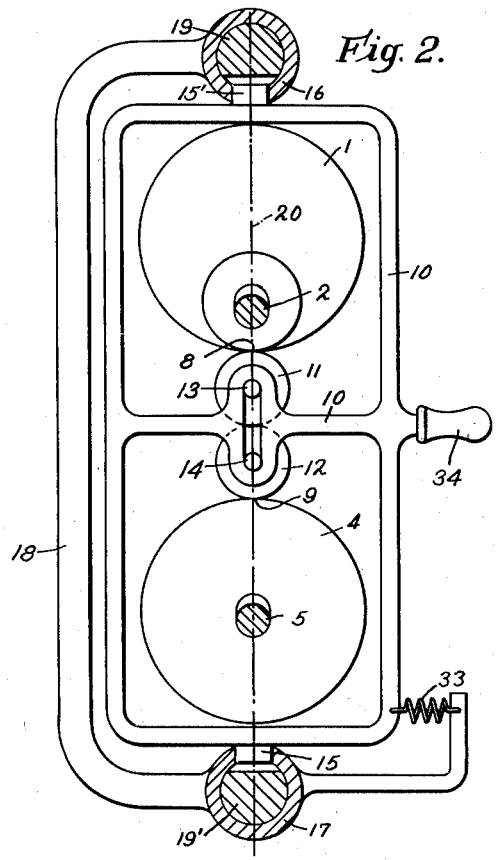
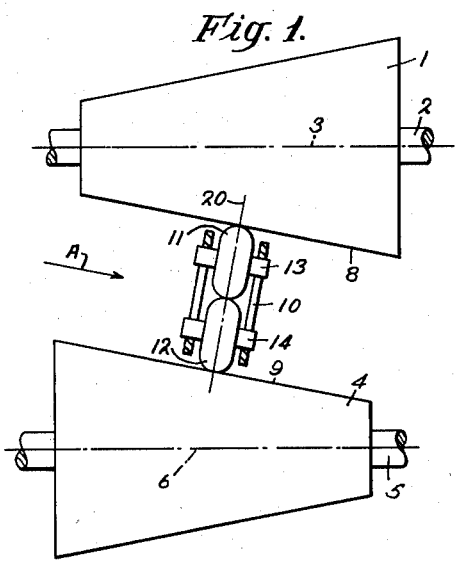
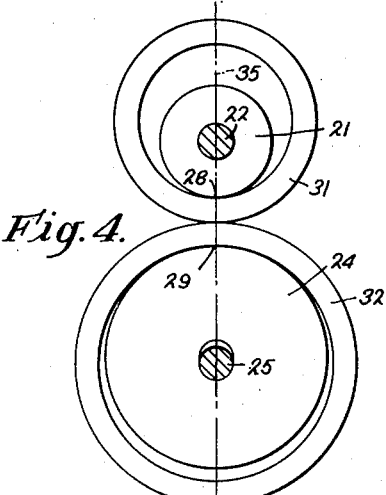
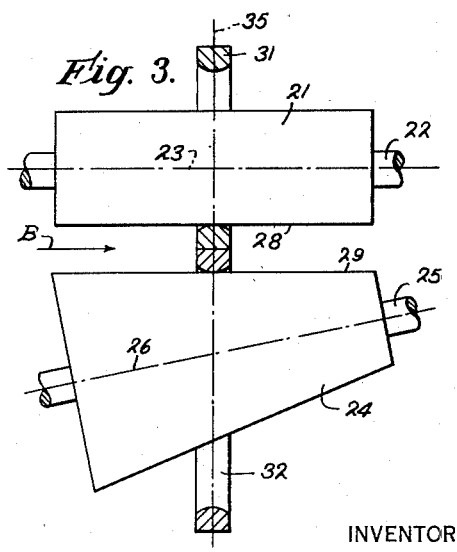
WITNESSES:
INVENTOR
Stanley J. Mikina.
BY
ATTORNEY Jan. 29, 1952  S. J. MIKINA  2,583,790
FRICTIONAL GEAR MECHANISM
Filed Nov. 10, 1948  2 SHEETS—SHEET 2
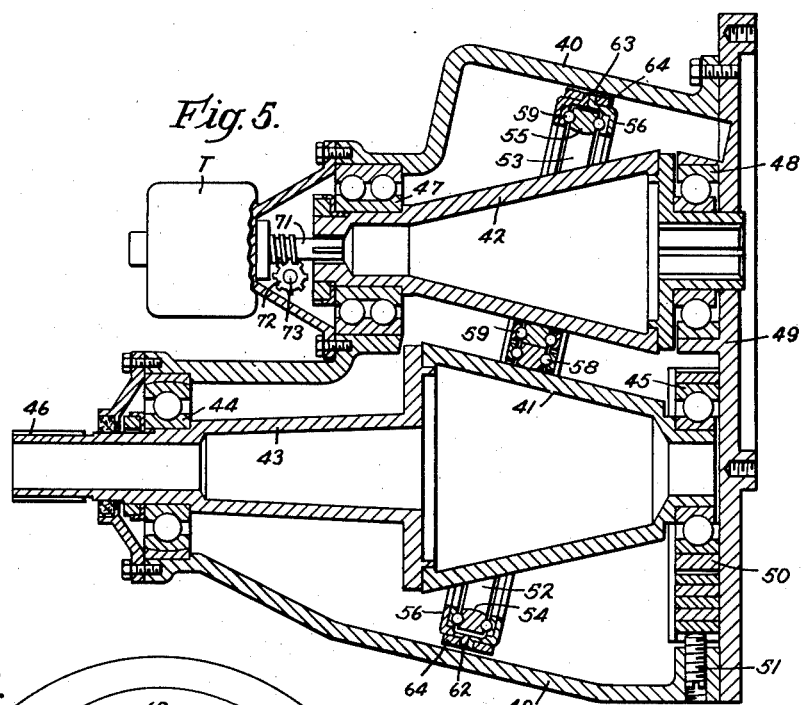
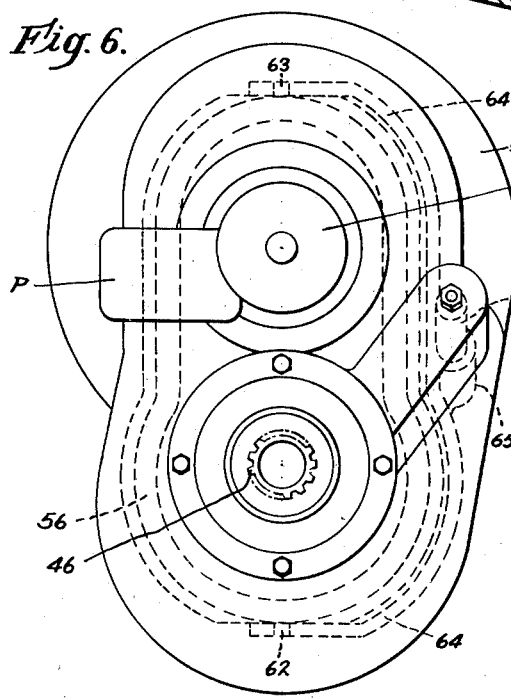
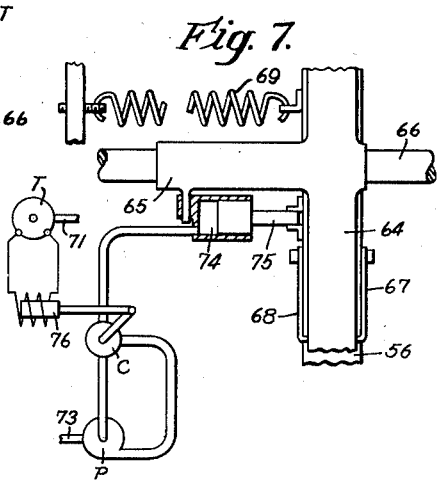
WITNESSES:
Edward Michaels
Nw. L. Groome
INVENTOR
Stanley J. Mikina.
BY
C. M. Avery
ATTORNEY Patented Jan. 29, 1952

2,583,790

UNITED STATES PATENT OFFICE 2,583,790

FRICTIONAL GEAR MECHANISM

Stanley J. Mikina, Wilkinsburg, Pa., assignor to Westinghouse Electric Corporation, East Pittsburgh, Pa., a corporation of Pennsylvania Application November 10, 1948, Serial No. 59,243

5 Claims. (Cl. 74—190.5)

My invention relates to frictional gear mechanisms in which a driving rotor transmits movement to a driven member through frictional engagement with a roller whose axis is displaceable in the axial direction of the rotor.

Mechanisms of this type are known as stepless speed transmissions, as regulating means for obtaining a constant output speed from a variable-speed drive, for positioning and other servomotor purposes, for transforming rotary into translational movement, and for other speed or power transmitting purposes. My Patent No. 2,428,807, assigned to the assignee of the present invention, is representative of the art as regards some of the just-mentioned applications.

It is an object of the invention to provide frictional gear mechanism, for any of the above-mentioned uses, that, under otherwise comparable conditions, is better capable of withstanding high stress and continuous operation than those heretofore known and thus ensures a long useful life under exacting performance requirements.

Another object of the invention, related to the foregoing, is to provide frictional gear mechanisms in which the force for displacing the friction roller along the driving rotor is not only provided by the rotor itself but also occurs as a pair of forces so directed as to have substantially only a displacing but no appreciable tilting effect on the friction roller or its cradle or carriage structure.

Another object of the invention is to provide a stepless speed-change gear capable of servomotoric adjustment so that only a slight control stimulus is needed for causing the gear to automatically and continuously change its transmission ratio. An object subsidiary to the one just mentioned, is to devise such a variable speed transmission in such a manner that it has a constant output speed regardless of changes in input speed.

It is also an object of the invention to design speed-change gears or constant-output-speed gears in such a manner that the frictional mechanism operates under rolling friction, i. e., minimizes or obviates the occurrence of sliding friction during periods of speed change or speed regulation.

An object of the invention is further to provide a variable speed transmission of the kind mentioned in which the normal force applied to the friction surfaces is automatically decreased as the gear is being adjusted toward a lower transmission ratio, thus maintaining an approximately constant horse-power output capacity and extending the useful life of the mechanism.

These and other objects of the invention will be apparent from the following description in conjunction with the drawings.

Figure 1 shows a front view, and Fig. 2 a more detailed side view, taken in the direction of the arrow A of Fig. 1, of a variable-speed transmission according to the invention. Both figures are schematic and limited to salient features to facilitate explaining the invention;

Fig. 3 is a simplified, explanatory front view of another embodiment which incorporates a preferred form of annular friction rollers (rings), while Fig. 4 is a side view of the same mechanism, the view being taken in the direction of the arrow B of Fig. 3;

Fig. 5 is a sectional view of a variable-speed transmission of constant output speed designed in accordance with the principles of my invention and corresponding more specifically to the schematic showing of Figs. 3 and 4;

Fig. 6 is an axial or side view of the transmission of Fig. 5, the view being taken from the left of Fig. 5; and Fig. 7 shows a detail of the same transmission together with a schematic illustration of appertaining electric and hydraulic control devices.

According to Figs. 1 and 2, a conical rotor 1 mounted on a shaft 2 is revolvable about an axis 3 and another conical rotor 4 on shaft 5 is revolvable about the axis 6. The two axes 3 and 6 extend in a common plane, and the two rotors have adjacent generatrices 8 and 9 which extend parallel to each other in the common axial plane of the two rotors.

Disposed between the rotors is a cradle or journalling structure 10 for two friction rollers 11 and 12 which are revolvable on respective shafts 13 and 14. The two rollers are so journalled in the cradle 10 that their respective axes of revolution extend parallel to each other. The cradle structure 10 is displaceable with the two friction rollers along the generatrices 8 and 9 in the direction indicated in Fig. 1 by an arrow A or in opposition to this direction.

One of the two rotors is driving and the other is driven through the two intermediate friction rollers. In the illustrated position, the two parallel roller axes extend in the common axial plane of the two rotors. The speed ratio between driving and driven rotor is determined by the diameter ratio of these rotors at the point of contact of the adjacent friction roller. Assuming that rotor 1 is driving and rotor 4 driven, and that the speed of rotor 1 is constant, the output speed of shaft 5 increases if the roller carriage 10 is displaced in the direction of arrow A and decreases with a carriage displacement in the opposite direction. Such a displacement is effected in the following manner.

Whenever the roller cradle is in a position in which the roller axes extend in the axial plane of the rotors, the forces transmitted from the driving rotor to the adjacent roller and from the other roller to the driven rotor extend only in tangential directions. Consequently, no forces are transmitted from the rollers to the carriage which have a component along the respective generatrices. However, the cradle structure 10 and the rollers mounted therein are pivotally journalled so that the cradle can be tilted about a pivot axis 20 perpendicular to the generatrices at which the two rotors engage the friction rollers.

In order to provide for such pivoting, two pivot studs 15 and 15' are mounted on the cradle structure 10. The studs are journalled in elongated sleeves 16 and 17 that are interconnected by a bar 18 and thus form part of a rigid frame structure. The sleeves 16 and 17 are slidable along guide rods 19 and 19' which extend in a direction perpendicular to the plane of illustration of Fig. 2. Thus the cradle structure 10, and the rollers 11 and 12 journalled thereby, are displaceable along the generatrices 8 and 9 and are also tiltable about the pivot axis 20 perpendicular to these generatrices. Normally, the cradle structure 10 is biased to a normal position relative to the frame, this position being shown in Figs. 1 and 2. The biasing means are schematically represented by a spring 33 disposed between frame and cradle. The device is further provided with means for applying a tilting force to the cradle. These tilting means are schematically represented in Fig. 2 by a handle 34. It is, of course, necessary to apply pressure between rotors and rollers in order to ensure the required rolling friction. The pressure means are omitted in Figs. 1 to 4, but a complete example of a suitable design is given below with reference to Figs. 5 and 6. In the apparatus according to Figs. 1 and 2, the cradle and rollers have the illustrated position for any given speed setting.

When the cradle 10 is tilted so that the axes of the friction rollers 11 and 12 assume an angular position relative to the common axial plane of the rotors 1 and 4, the force imparted by the driving rotor to the adjacent friction roller extends at an angle to the diametrical rotor plane at the point of frictional contact. That is, the force transmitted to the roller has now a component in the direction of the generatrix. Similarly, the force transmitted between the other friction rotor and the driven rotor has now a component along the generatrix. Due to the presence of two friction rollers between the rotors, the two components along the respective generatrices are in the same direction. For instance, both forces are in the direction of arrow A or in opposition thereto depending upon whether the roller cradle is tilted in one or the other direction from its normal position. As a result the cradle 10 is driven along the generatrices and adjusts itself to a new position, thus changing the transmission ratio of the gear. When the pivoting force is removed, the spring-biased carriage resumes its normal position so that then a new transmission ratio is established.

It will be recognized from the foregoing that, due to the occurrence of two displacing forces at the respective points of contact of the friction rollers, the stresses imposed on the cradle bearings and the cradle carriage or other supporting and guiding means is a minimum. As a matter of fact, by proper dimensioning, the two displacing forces can be made equal so that stresses in undesired directions are fully prevented. It will also be recognized that the forces necessary for displacing the cradle and hence for changing the speed adjustment are provided by the speed change mechanism itself. That is, the force needed for pivoting the cradle about the axis 20 may be extremely slight, because the mechanism acts inherently as a servomotor and provides its own displacing forces.

The embodiment schematically shown in Figs. 3 and 4 is represented in a more simplified form by showing only the rotors and appertaining friction rollers. According to Figs. 3 and 4, a cylindrical rotor 21 on shaft 22 is revolvable about an axis 23, and a conical rotor 24 on shaft 25 is revolvable about an axis 26 which extends in a common plane with the axis 23 of rotor 21 but is angularly related to axis 23. The adjacent generatrices 28 and 29 of the rotors are parallel. The two friction rollers appertaining to the respective rotors are designed as annular members 31 and 32, respectively. These annular members engage each other between the rotors with respective cylindrical surfaces. The inner surfaces of members 31 and 32 in engagement with the respective rotors 21 and 24 are preferably curved in order to facilitate pivoting the roller assembly. The two members 31 and 32 are journalled so that they always retain the illustrated position relative to each other but can move together in the direction of the generatrices 28 and 29 as is indicated by the arrow B. Suitable cradle and guiding means for such annular friction rollers will be described below with reference to the embodiment shown in Figs. 5 to 7. In the normal position of the annular rollers 31 and 32, as illustrated in Figs. 3 and 4, the parallel axes of revolution of these rollers extend in the common axial plane of rotors 21 and 24. The annular rollers 31 and 32 can be pivoted about an axis 35 which corresponds to the pivot axis 20 in Figs. 1 and 2.

A device according to Figs. 3 and 4 operates in a manner similar to that explained in the foregoing with reference to Figs. 1 and 2. As long as the annular rollers 31 and 32 retain a given normal position, the transmission ratio of the mechanism is in accordance with the ratio of the rotor diameters at the respective points of contact. When the roller assembly is pivoted, two component forces of the same direction act on the two rollers at the respective points of contact with the rotors and displace the roller assembly in the direction of the arrow B or in opposition thereto, thereby changing the transmission ratio until the roller assembly assumes another normal position.

It will be understood from the foregoing that the invention as far as described requires compliance with four essential requirements:

1. The axes of the two rotors are in a common plane.

2. Each rotor has a generatrix which extends in parallel to a generatrix of the other rotor in the common axial plane.

3. The two friction rollers have parallel axes of revolution.

4. The friction rollers are displaceable, in fixed positional relation to each other, along the above-mentioned generatrices and are also pivoted about an axis perpendicular to these generatrices.

It should be understood that the geometric features included in the foregoing need not always be taken in their strict sense, and that slight deviations, such as may be required by mechanical or design considerations or are inevitable for practical reasons, are admissible as long as the requirements remain substantially fulfilled.

As far as the basic principle and design of mechanisms according to my invention is concerned, features other than the four mentioned requirements may be modified in various ways, for instance, depending upon the intended use. For example, if two conical rotors are used, they do not have to be of equal size. This is apparent from Fig. 5 showing two conical rotors of equal axial extent, but different volumetric size. As a matter of fact, for a variable speed transmission it is merely necessary that the diameter ratio of the two rotors vary progressively with a progressive displacement of the roller cradle, and this requirement can also be met if, for instance, one of the rotors is cylindric (Figs. 3, 4) or if both are conical but arranged so that the respective wider ends are adjacent to each other. In this respect, the design to be chosen depends upon the desired range of speed change or speed regulation, a maximum range of variable speed ratios for any given rotor length being obtained with a mutually inverse arrangement of conical rotors as exemplified by Figs. 1 and 2 or 5 to 7. If the mechanism is not intended to operate as a variable speed transmission, but serves primarily to translate rotational movement into translational displacement of the roller cradle, this displacement being utilized for positioning purposes, then both rotors may be cylindrical and one or both of them may then be driving.

It will be noted that it is not within the above-mentioned basic requirements to have the rotor axes extend in parallel to each other as long as they are in a common axial plane. However, a design with parallel rotor axis is often preferable because it leads to a simpler and usually more conveniently mountable apparatus. This will be apparent from the embodiment illustrated more in detail by Figs. 5 to 7 and described presently.

The variable speed mechanism according to Figs. 5 to 7 is designed for maintaining the speed of its output shaft at a constant value regardless of speed variations of the driving shaft. The illustrated mechanism was designed for application on aircraft for the purpose of driving an electric alternator at constant speed with a variable speed input from the aircraft propelling engine. A constant output speed of 6000 R. P. M. was to be obtained from an input speed varying between 2100 and 9000 R. P. M.

The mechanism has a housing and supporting structure 40. Journalled within the housing are two conical rotors 41 and 42 of hardened steel. The two rotors have a common axial plane and two parallel adjacent generatrices, respectively, in the common axial plane. Rotor 41 has a shaft structure 43 and is journalled in roller bearings 44 and 45. The shaft end 46 is to be driven from the engine at the above-mentioned variable speeds. The rotor 42 is journalled in roller bearings 47 and 48. Bearing 48 is firmly mounted on a supporting plate 49 which is firmly secured to the housing structure 40. Bearing 45 is displaceably mounted on the plate 49 so that it can move toward and away from the bearing 48. Bearing 45 is biased toward the bearing 48 by leaf springs 50 whose force can be adjusted by means of a screw 51. In this manner the two rotors and the intermediate friction rollers are held in engagement with one another under the normal force needed to secure the desired transmission of power.

Rotor 41 is surrounded by an annular friction roller 52 and rotor 42 by an annular friction roller 53. In this respect the design is similar to that explained above with reference to Figs. 3 and 4.

The inner friction surfaces 54 and 55 are curved in order to permit pivoting the roller assembly.

The two annular rollers are journalled in a cradle structure 56 by means of thrust bearings 58 and 59 which engage the axial faces of the rollers.

The cradle structure 56 is approximately eight-shaped and surrounds both rotors 41 and 42. Structure 56 is equipped with pivot studs 62 and 63 whose common axis intersects the axes of the two rotors. The pivot studs engage pivot openings of a frame or cradle support 64. This support has a sleeve portion 65 slidably mounted on a guiding rod 66. The guiding rod is firmly secured to the housing structure 40 and extends in parallel to the direction of the parallel generatrices of rotors 41 and 42. Consequently, the support 64 and the roller cradle pivoted thereon are movable as a whole along the direction of these generatrices in accordance with the principle explained above with reference to Figs. 1 to 4. The roller cradle is normally held in the illustrated position by means of biasing leaf springs 67 and 68 which have one end attached to the roller cradle while their respective other ends rest against the supporting frame 64. In addition, a biasing spring 69 is provided whose biasing force must be overcome by the hydraulic pivoting means described in a later place.

The drive ratio is changed by turning the cradle structure 56 about the pivots 62, 63. As the cradle is turned, the annular rollers acquire an axial velocity parallel to the parallel generatrices or the cones. This axial translational velocity is the vector difference of the difference of the peripheral velocity of the rollers and of the rotors at the respective points of contact, being numerically equal to the peripheral speed of the rotor at the contact point times the tangent of the angle of turn of the rollers from the roller plane that is initially perpendicular to the parallel generatrices of the rotors. The axial displacement of the rollers along these generatrices and the resulting change in drive ratio are effected without requiring appreciable extraneous force and simply by altering the geometry of the drive so as to cause the rollers to advance along the rotors much like a nut on a screw of infinitely variable pitch.

It should be noted that two rings are interposed between the drive cones in the relationship shown so as to insure a minimum of slip at the driving friction surfaces when the rings are turned about the cradle pivot axis. If the radial thickness of the annular rollers is made proportional to their diameters, the peripheral velocity of the surface of each roller contacting its rotor will at all times be equal to the corresponding peripheral velocity of the other roller. Hence, as the two rollers are tilted through an angle $\theta$, both acquire a translational velocity equal to $V \tan \theta$, where $V$ is the peripheral velocity of the rotor at the contact point with the rings at a given position. As the contact position changes due to translational motion, the peripheral velocity of the driven rotor is made at all times to conform to the peripheral velocity at the driving rotor-roller pair.

As described, the normal force holding the contact surfaces of rotors and rollers together is applied to the right end bearing block (Fig. 5) of the driving rotor 41 by means of a stack of springs 50 that are bowed by means of a screw 51 at their center. The bearing block as well as the loading springs are guided by guide channels projecting from the inner face of the housing cover 49. The left end bearing 44 of the driving rotor 41 is self-aligning to permit the full spring load to be applied to the friction surfaces of the drive.

To extend the life of the unit, the normal force applied to the friction surfaces is varied with the transmission ratio to maintain approximately constant horsepower output capacity. This is achieved by positioning the self-aligning bearing 44 far enough to the left of the driving rotor 41 to obtain a suitable lever multiplication of the normal force at the small end of the driven rotor, where the tangential force transmitted from roller to rotor is the greatest. As the rollers travel to the low ratio end on the right of Fig. 5, the normal force is automatically reduced in proportion to the increase in driven rotor radius.

For obtaining constant output speed from a variable speed input, the mechanism is provided with a governor that responds to small changes in alternator speed and causes a hydraulic motor to vary the drive ratio.

The governor comprises a tachometer generator T whose shaft 71 is driven from the rotor 42. Shaft 71 also drives, through a worm gear 72, the shaft 73 of an oil pump P (Fig. 7). The pump passes the oil through a hydraulic pressure system which is connected through a control valve C to a cylinder 74. Cylinder 74 is mounted on the cradle supporting frame 64 and the appertaining piston 75 is linked to the cradle 56. The pressure normally applied to the cylinder and piston device is such as to balance the force of the biasing spring 69 so that then the cradle and roller assembly remain in the normal position relative to the frame 64. When due to the operation of the valve C, the pressure applied to the cylinder 74 is varied, the cradle and roller assembly is pivoted in one or the other direction, depending upon the magnitude and direction of the departure from the normally existing pressure. The valve C is magnetically controlled by a voltage-responsive electromagnet 76 which is energized from the tachometer generator T. The valve is in normal position and provides normal control pressure when the generator is running at the desired constant speed. A departure from this speed in one or the other sense causes corresponding changes in valve adjustment. As a result, the roller assembly is pivoted and changes the speed ratio of the transmission in the sense and by the magnitude required to maintain the generator speed at a constant value.

I claim as my invention:

1. A frictional gear mechanism, comprising a driving rotor and a driven rotor having a common axial plane and being both of conical shape, said rotors having parallel respective generatrices in said plane and having the wide end of either rotor adjacent to the narrow end of the other rotor, two annular friction rollers surrounding said respective rotors and having a common plane of revolution and parallel respective axes, said rollers engaging each other between said rotors and engaging said respective rotors at points on said respective generatrices so that the speed ratio of said rotors depends upon the position of said points along said respective generatrices, a support displaceable along said generatrices, a cradle journalling said rollers and being pivoted on said support, spring means disposed between said support and said cradle for biasing said cradle to an angular position relative to said support in which said roller axes are parallel to said generatrices, and control means attached to said cradle and to said support for turning said cradle away from said position.

2. A frictional gear mechanism, comprising a driving rotor and a driven rotor having a common axial plane and having parallel generatrices respectively in said plane, two friction rollers having parallel axes respectively and being in engagement with each other and with said rotors at respective points on said generatrices, said rotors having progressively different diameter ratios at progressively different points of roller and rotor engagement so that the speed ratio of said rotors depends upon the position of said rollers along said generatrices, a cradle journalling said rollers and being displaceable in a direction parallel to said generatrices and angularly movable about an axis perpendicular to said direction, biasing means tending to hold said cradle in an angular position in which said roller axes are parallel to said generatrices, a tachometer generator connected with said driven rotor to provide a voltage proportional to the speed of said driven rotor, and voltage-responsive actuator means connected with said cradle for turning it away from said angular position in opposition to said biasing means when said speed departs from a desired value.

3. A frictional gear mechanism, comprising a driving rotor and a driven rotor having a common axial plane and being both of conical shape, said rotors having parallel respective generatrices in said plane and having the wide end of either rotor adjacent to the narrow end of the other rotor, two annular friction rollers surrounding said respective rotors and having a common plane of revolution and parallel respective axes, said rollers engaging each other between said rotors and engaging said respective rotors at points on said respective generatrices so that the speed ratio of said rotors depends upon the position of said points along said respective generatrices, a support displaceable along said generatrices, a cradle journalling said rollers and being pivoted on said support, spring means disposed between said support and said cradle for biasing said cradle to an angular position relative to said support in which said roller axes are parallel to said generatrices, an actuator mounted on said support and having a movable member connected with said cradle, a tachometer generator connected with said driven rotor, and means connecting said generator with said actuator for controlling the latter in dependence upon the speed of said driven rotor for maintaining said speed substantially constant.

4. A frictional gear mechanism, comprising two conical and mutually spaced rotors arranged side by side so that the wide end of either is adjacent to the narrow end of the other rotor, said rotors having respective shafts with a common axial plane and having respective parallel generatrices closest to each other in said plane, two annular friction rollers surrounding said respective rotors and having parallel axes respectively, said rollers engaging each other between said rotors and engaging said rotors at points on said respective generatrices, a loop-shaped cradle surrounding both rollers and having thrust bearings in engagement with axial sides of said respective rollers supporting said rollers for rotation in a single plane of revolution, a cradle support displaceable in parallel to said generatrices, said cradle being pivoted to said support about a pivot axis perpendicular to said generatrices and in the plane of revolution of said rollers, and control means connected with said cradle for turning it about said pivot axis to permit placing said roller axes out of parallelism with said generatrices.

5. A frictional gear mechanism, comprising two conical rotors of substantially equal axial length but different diametrical size, said rotors having parallel respective axes in a common plane and having parallel respective generatrices next to each other in said plane, two annular friction rollers of different respective diameters which surround said respective rotors and are revolvable in a common plane, said rollers being in engagement with each other between said rotors and engaging said respective rotors at respective points on said generatrices, the diametric thicknesses of said rollers between said rotors being proportional to said roller diameters, a cradle journalling said rollers and being displaceable in a direction parallel to said generatrices and angularly movable about an axis perpendicular to said direction to permit placing said roller axes out of parallelism with said generatrices for causing said rotors to displace said cradle in said direction.

STANLEY J. MIKINA.

REFERENCES CITED

The following references are of record in the file of this patent:

UNITED STATES PATENTS

| Number | Name | Date |
|---|---|---|
| 414,191 | Conant | Nov. 5, 1889 |
| 760,460 | Leighton | May 24, 1904 |
| 1,191,771 | Delacour | July 18, 1916 |
| 2,089,003 | Sack | Aug. 3, 1937 |
| 2,205,031 | Bugden | June 18, 1940 |
| 2,432,442 | Pourtier | Dec. 9, 1947 |
| 2,461,258 | Brooks | Feb. 8, 1949 |

FOREIGN PATENTS

| Number | Country | Date |
|---|---|---|
| 788,778 | France | Aug. 5, 1935 |
| 316,887 | Italy | Apr. 17, 1934 |